C. DRILL.
TRACTOR.
APPLICATION FILED OCT. 27, 1916.

1,319,995.

Patented Oct. 28, 1919.
6 SHEETS—SHEET 1.

Inventor,
CLIFFORD DRILL,
Knight Bros,
Attorneys.

C. DRILL.
TRACTOR.
APPLICATION FILED OCT. 27, 1916.

1,319,995.

Patented Oct. 28, 1919.
6 SHEETS—SHEET 4.

Inventor,
CLIFFORD DRILL,
Knight Bros
Attorneys.

C. DRILL.
TRACTOR.
APPLICATION FILED OCT. 27, 1916.
1,319,995.
Patented Oct. 28, 1919.
6 SHEETS—SHEET 5.
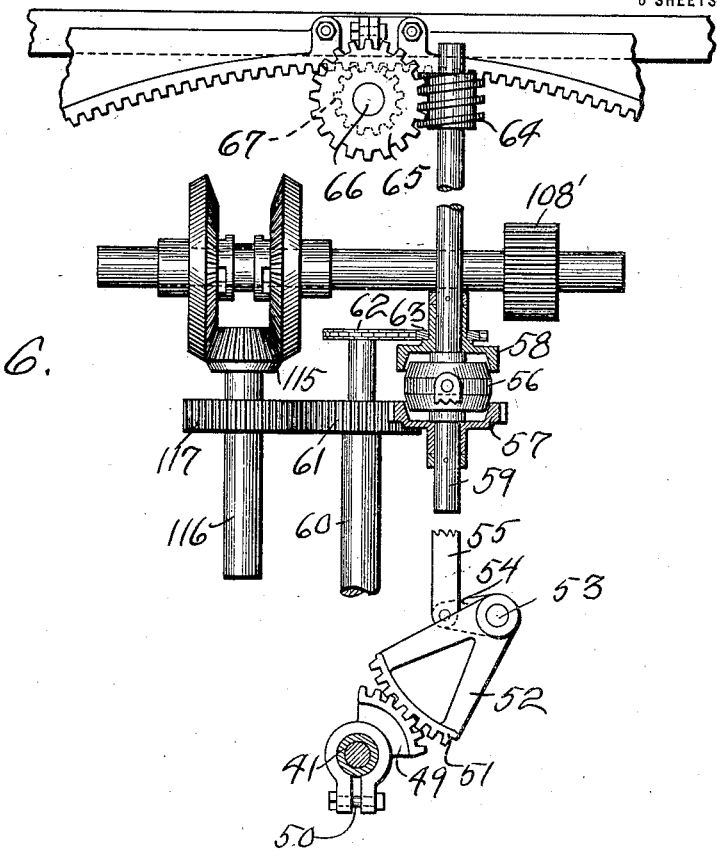
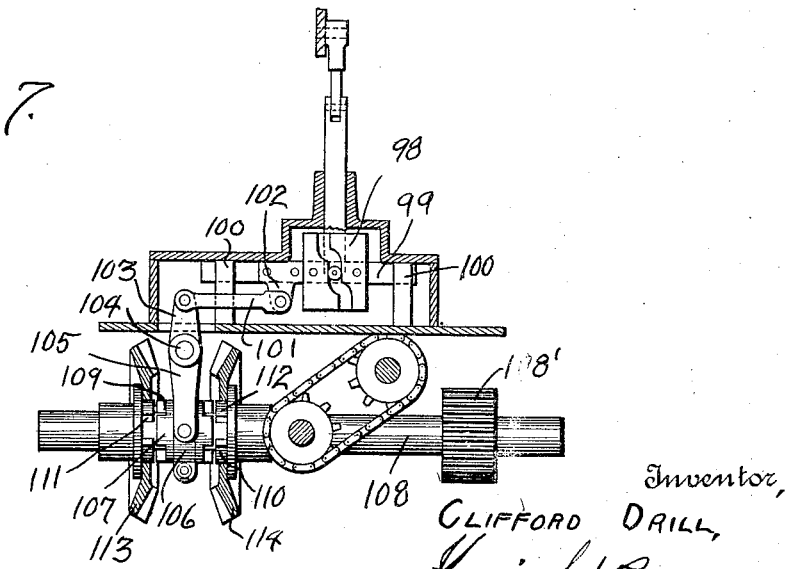
Inventor,
CLIFFORD DRILL,
Knight Bros
Attorneys.

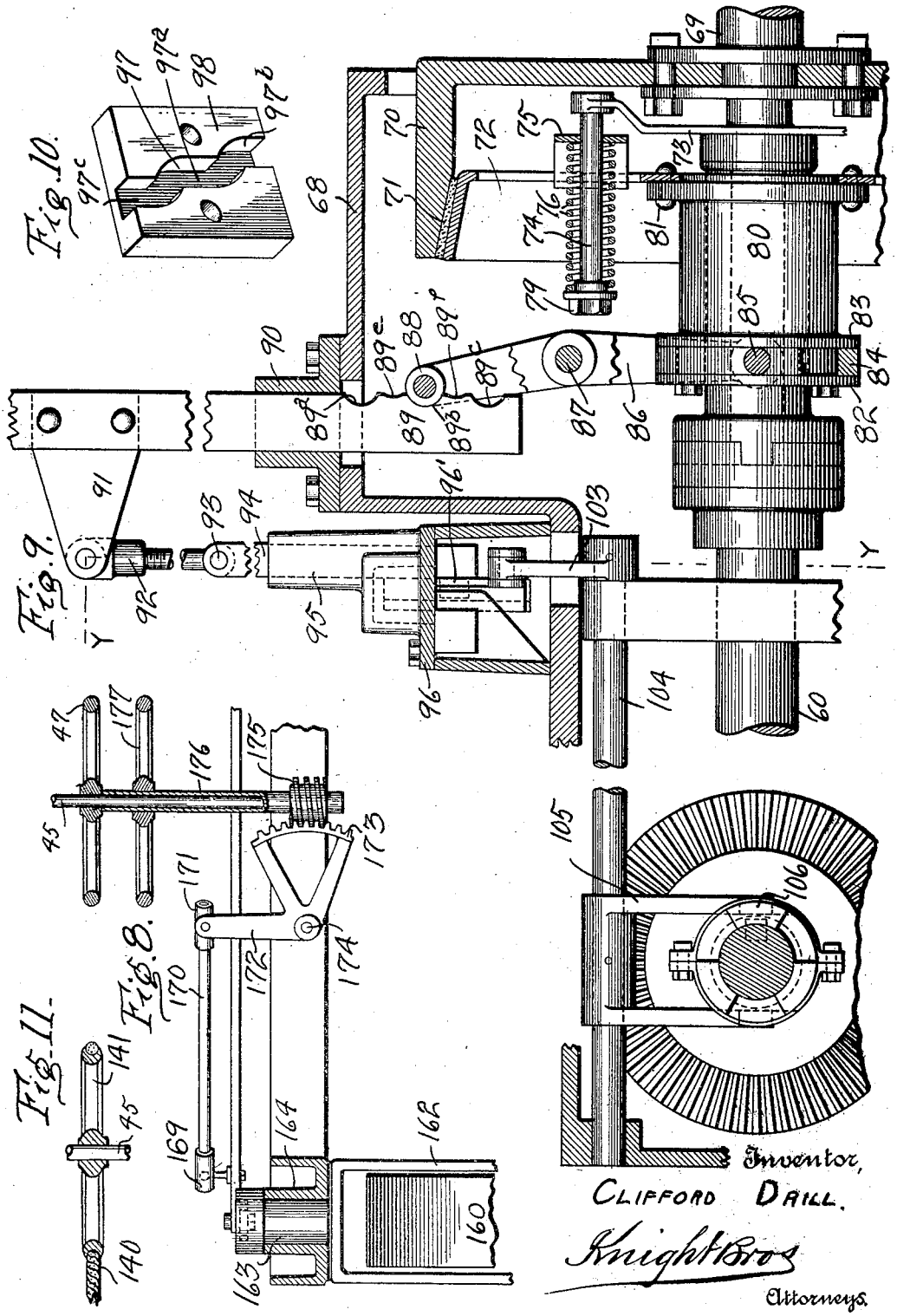

UNITED STATES PATENT OFFICE.

CLIFFORD DRILL, OF GREENVILLE, OHIO.

TRACTOR.

1,319,995.   Specification of Letters Patent.   Patented Oct. 28, 1919.

Application filed October 27, 1916. Serial No. 128,057.

*To all whom it may concern:*

Be it known that I, CLIFFORD DRILL, a citizen of the United States, residing at Greenville, in the county of Darke and State of Ohio, have invented certain new and useful Improvements in Tractors, of which the following is a specification.

My invention relates to tractors of a type adapted to be employed as a prime motor for the various tillage, planting and like machinery employed in farm work and its object is to provide an improved device of this character adapted for use in small areas as well as in large fields to which end the tractor is provided with means whereby it may be steered by both the front and rear wheels and, consequently, may be turned in a very limited space.

It is a further object of the invention to provide means for adjusting the position of the front and rear wheels laterally with respect to each other to suit the various conditions under which the tractor is employed.

To secure the desired traction, large and powerful driving wheels are employed and in order that these wheels may be turned to steer the tractor with a minimum of effort upon the part of the operator, means are provided whereby the position of these wheels may be shifted by power from the motor of the tractor.

Both the motor and the steering gear of the tractor are controllable from a driving seat upon the tractor or from a remote point of control, such for instance as the implement or machine to which the tractor is hitched.

Further objects and advantages of the invention will be set forth in the detailed description which now follows:

In the accompanying drawing—

Fig. 6 is a plan view, partly in section, of certain connections by means of which power from the motor is utilized to turn the front or drive wheels for the purpose of steering the tractor.

Fig. 7 is a vertical sectional view through a portion of the transmission mechanism of the tractor, this view being taken upon line Y—Y of Fig. 9.

Fig. 8 is a view partly in elevation and partly in vertical section of the steering mechanism for the rear wheels.

Fig. 9 is a longitudinal, sectional view through the transmission casing of the tractor with certain of the transmission mechanism in elevation and other of the transmission in section.

Fig. 10 is a detail perspective view of a cam block hereinafter described, and

Fig. 11 is a modified view showing means for actuating the steering mechanism from a remote point.

Like numerals designate corresponding parts in all of the figures of the drawing.

In the accompanying drawings:

Figure 1:
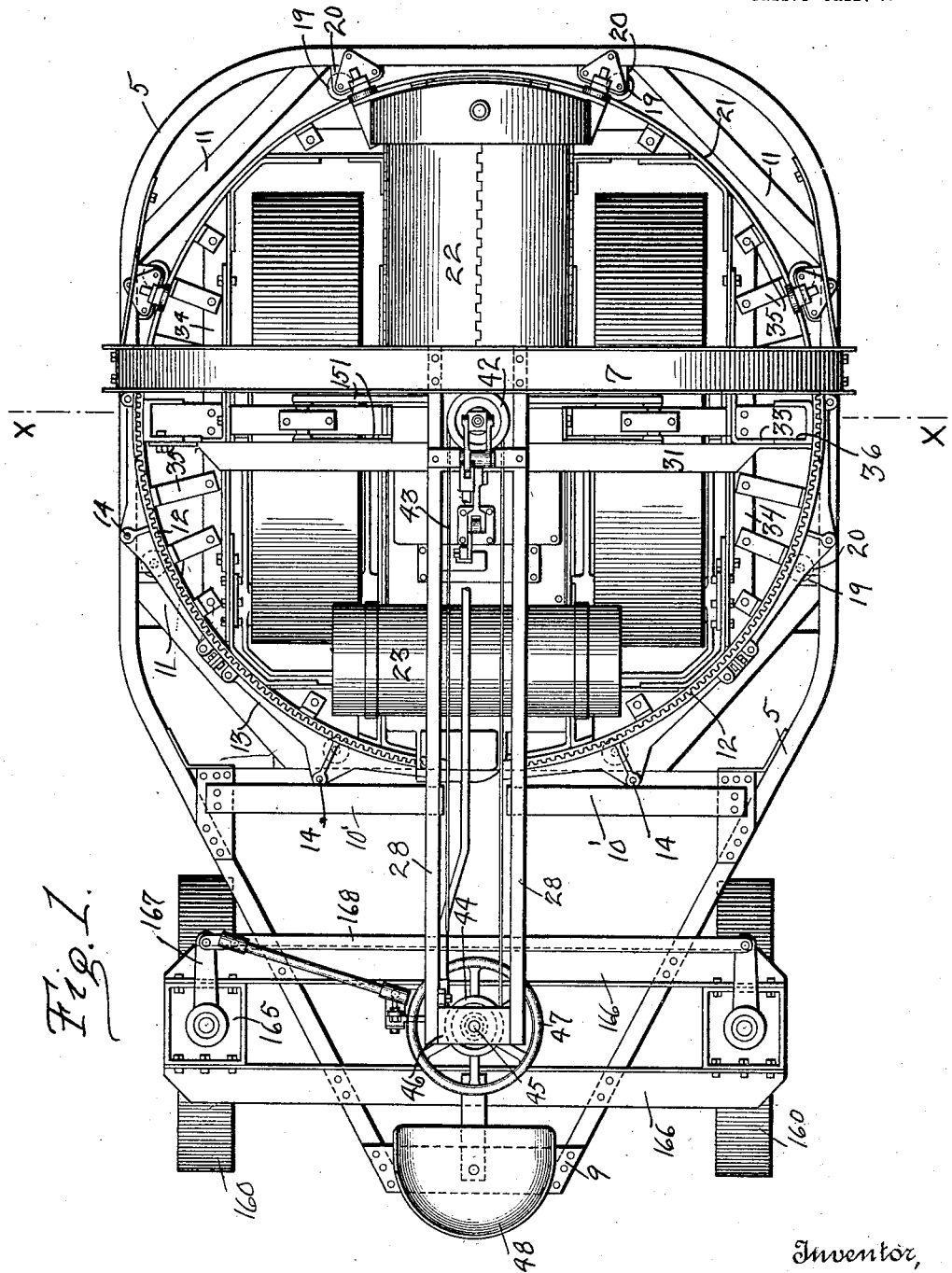
Figure 1 is a plan view of a tractor constructed in accordance with the invention.
Figure 2:
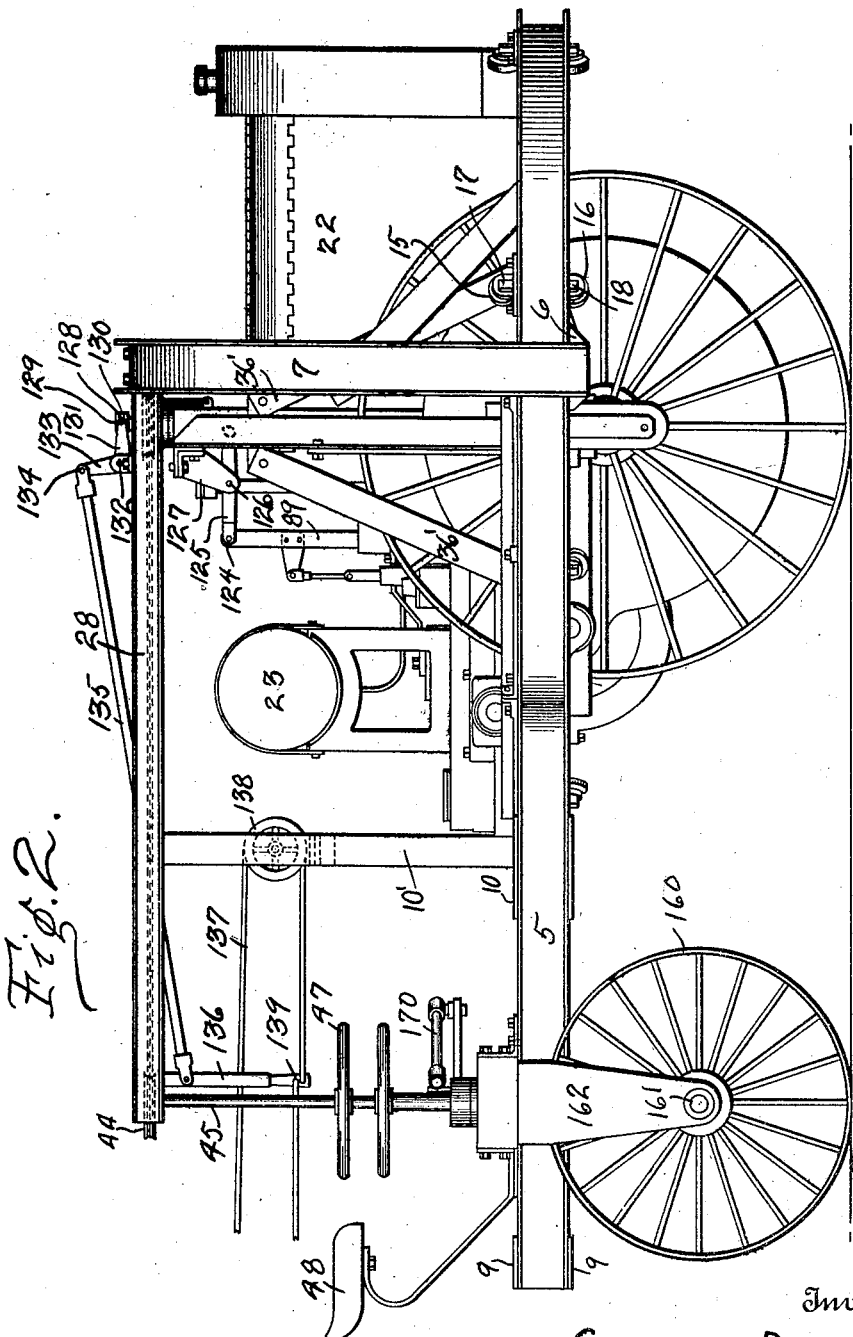
Fig. 2 is a side view thereof.
Figure 3:
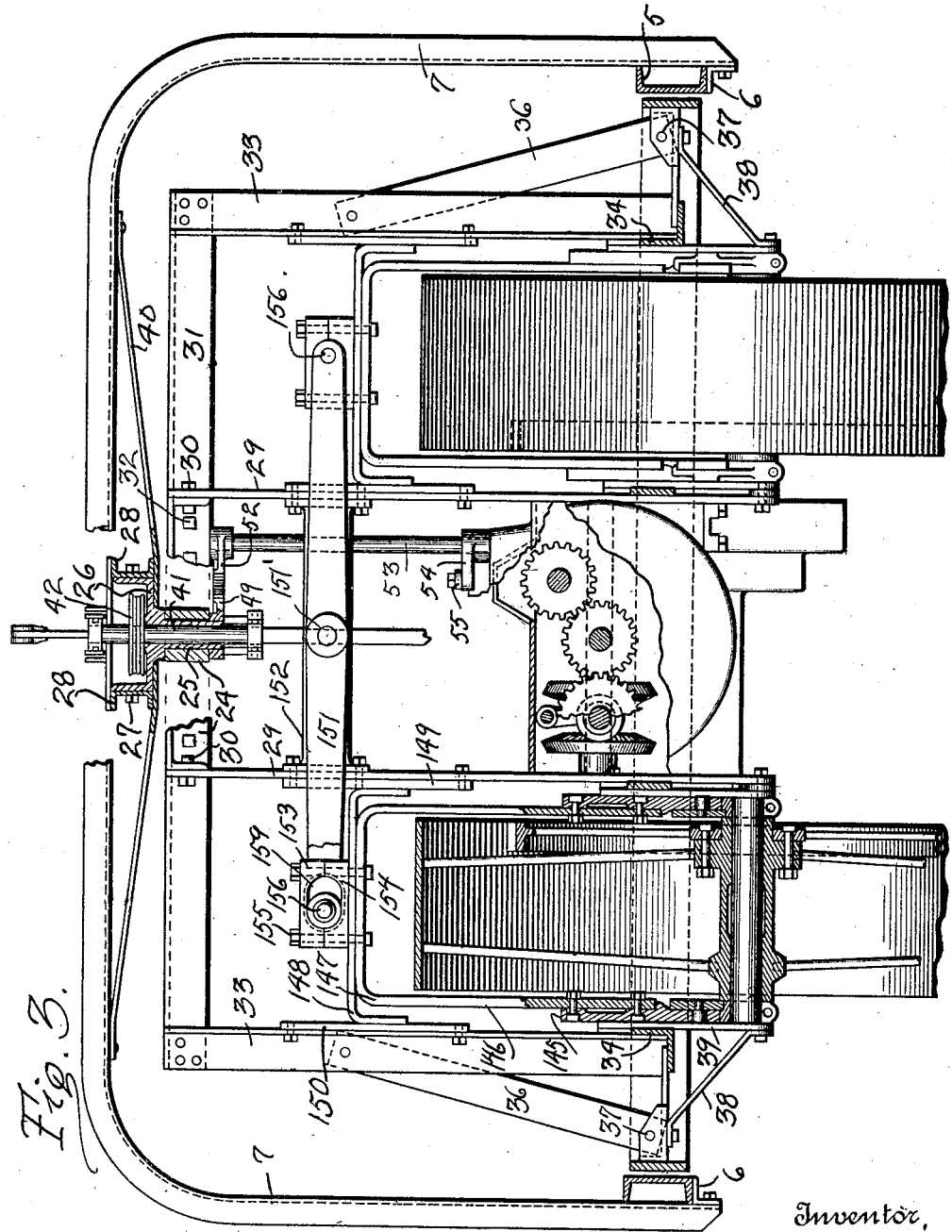
Fig. 3 is a transverse vertical section upon line X—X of Fig. 1.

5 designates a channel iron constituting one of the members of a main frame. Secured to this channel iron by brackets 6 is an arch 7. Transverse braces 9 and 10 and oblique braces 11 impart the desired strength and rigidity to the main frame. An arcuate rack bar 12 is provided with a rib or flange 13 through the medium of which said rack bar is secured to the main frame by fastening devices indicated at 14. Vertical rollers 15 and 16 that are mounted in brackets 17 and 18 and horizontal rollers 19 that are mounted in brackets 20 of the main frame constitute a circular way within which a circular frame is mounted and has movement. This circular frame comprises an annular member 21, the edges of which engage with the vertical rollers 15 and 16 and the outer face of which engages with the horizontal rollers 19. Power for driving the tractor is derived from a motor (not shown) the casing of which is indicated at 22 and the fuel supply tank for which is indicated at 23 and it may be here stated that the motor, the traction wheels and the transmission mechanism are all mounted upon and move bodily with the circular frame. The circular frame has a pivotal connection with the main frame through the medium of a casting 24 that is concentric with the circular frame and is bored to receive a sleeve like extension 25 of a casting 26 that is bolted at 27 between rearwardly extending longitudinal frame members 28 which constitute a part of the main frame and the forward ends of which are supported by the arch 7. Braces 10' extend between frame members 28 and main frame members 5. The casting 24 is supported by vertical bars 29 to which it is bolted at 30 and by a transverse angle iron 31 to which it is bolted by bolts 32. The angle iron 31 is supported by vertical angles 33, the lower ends of which are connected to horizontal angles 34 that are supported by brackets 35 from the annular member 21. Inclined braces 36 extend between the angles 33 and the brackets 37 which project inwardly from the annular member 21 and engage the horizontal angles 34. Inclined braces 36' extend between the vertical angles 33 and the horizontal angles 34. Additional rigidity is imparted to the structure by braces 38 which extend from the under sides of the brackets 37 to the lower ends of guide plates 39 hereinafter described. A truss rod 40 extends beneath the longitudinally extending frame members 28 and its ends are secured to the under side of the horizontal portion of the arch 7. A hollow sleeve 41 extends through the sleeve 25 of the casting 26 and this sleeve 41 has a sheave 42 secured thereto, said sheave lying within the casting 26. A cable 43 passes around this sheave and around a corresponding sheave 44 that is mounted upon a shaft 45, the upper end of said shaft being journaled in a block 46 carried by the rear ends of the frame members 28.

Rotation may be imparted to the shaft 45 through the medium of a hand wheel 47 that is secured thereon, said hand wheel being disposed adjacent to a driver's seat 48.

It is apparent, therefore, that if rotation toward the right be imparted to hand wheel 47, rotation toward the right will be imparted to the sheave 42 through the connections described and this will in turn impart movement to a segmental gear 49, that is secured upon the lower end of the sleeve 41 by a bolt 50. The teeth 51 of a toothed segment 52 mesh with the teeth of the segmental gear 49. The toothed segment 52 is carried by a vertical shaft 53 which likewise carries an arm 54 that is connected through the medium of a link 55 with the shiftable member 56 of a cone clutch, and the movement of the link 55 through the connection described serves to move said shiftable member 56 to bring it into engagement with a spur gear wheel 57 or with a sprocket wheel carrying element 58 according to the direction in which the member 56 is moved. The member 56 is splined upon a shaft 59 and the gear wheel 57 and the sprocket carrying member 58 are loosely mounted upon said shaft. 60 designates a shaft to which movement is imparted from the motor 22 through suitable connections which will be presently described. This shaft carries a spur gear wheel 61 which meshes with the gear wheel 57 and it likewise carries a sprocket wheel 62 which drives the sprocket carrying member 58 through the medium of a sprocket chain 63. It will, therefore, be apparent that when the member 56 is moved to such position as to engage the gear wheel 57, motion will be imparted to the shaft 59 in a direction reverse to that of the shaft 60 and when the member 56 is moved into engagement with the sprocket carrying member 58, motion will be imparted to the shaft 59 in the same direction as that of the shaft 60. Mounted upon the rear end of the shaft 59 is a worm 64 which engages a worm wheel 65 mounted upon a vertical shaft 66. Disposed upon the shaft 66 and below the worm wheel 65 is a pinion 67 which meshes with the arcuate rack bar 12. It is, therefore, apparent that this construction renders it possible to impart a bodily turning movement to the circular frame and to utilize the power of the motor to accomplish this end, though the direction and degree of such turning movement is determinable and readily controllable by the operator who has only to manipulate the hand wheel 47 in one direction or the other in order to secure the desired turning movement of the circular frame.

Referring now to Fig. 9, 68 designates the transmission case of the motor. Mounted within this case upon the engine shaft 69 is the motor fly-wheel 70 having an internal tapered face 71 adapted to co-act with the face of a conical, annular member 72, the two in effect constituting a cone clutch. A spider 73 lies transversely of the shaft 69 and is carried by said shaft and this spider carries pins 74 which extend through bearing plates 75 of the annular clutch member 72. Springs 76 bear between the plates 75 and nuts or other headed portions 79 of the pins 74 and these springs normally tend to move the annular member 72 toward the right in Fig. 9 to bring its clutch face into engagement with the clutch face of the fly-wheel 70. A sleeve 80 is mounted for sliding movement toward and from the fly-wheel 70 and this sleeve is bolted to the annular clutch member 72 by means of bolts 81. The sleeve 80 is provided with flanges 82 and 83 between which a ring 84 has a seating. This ring 84 carries pins 85 which are engaged by the end of a forked lever 86. The lever 86 is pivoted at 87 and carries at its upper end, a roller 88, said roller being held by the action of the springs 76 in contact with the notched edge of a vertically movable bar 89. The bar 89 is movable through a bearing cap 90 and carries a bracket 91 to the outer end of which is secured the upper end of a link 92. The lower end of this link is pivotally connected at 93 with a sliding bar 94, the latter being guided in an extension 95 of a cap plate 96. The link 92 is made in two parts having threaded engagement with each other whereby the link is rendered adjustable and, consequently, the throw of the bar 94 may be adjusted. A roller 96' carried by the bar 94 projects into the cam groove 97 of the cam block 98. (See Figs. 7, 9 and 10.) This cam groove comprises a central portion 97$^a$, a lower portion 97$^b$ off-set toward the right with relation to the portion 97$^a$ and an upper portion 97$^c$ off-set toward the left with relation to the central portion 97$^a$ and the purpose of this will be presently explained.

Figure 4:
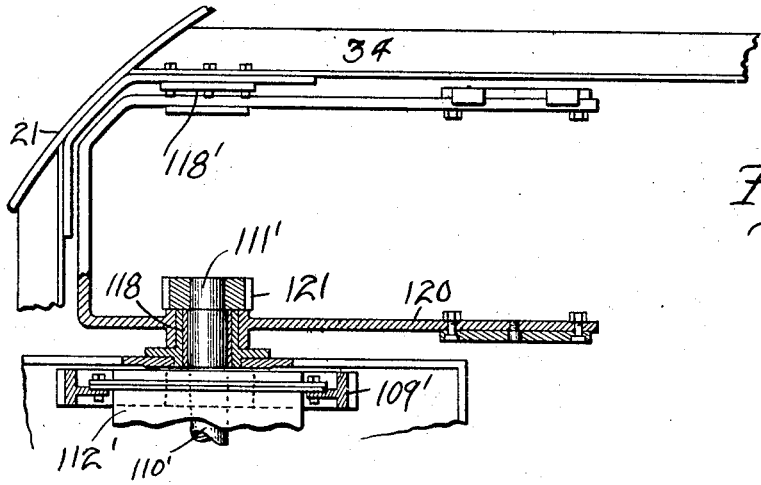
Fig. 4 is a detail sectional view illustrating a portion of the mounting of one of the front or driving wheels.
Figure 5:
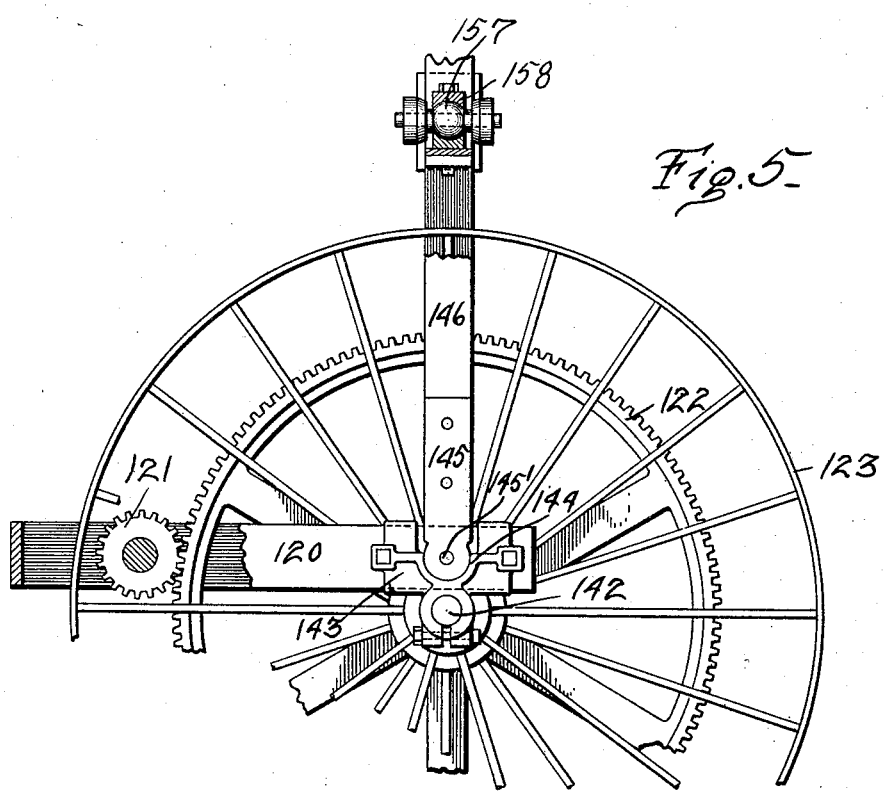
Fig. 5 is a side view, with certain of the parts broken away, of the mounting of one of the front or driving wheels.

The cam block 98 is secured to and movable with a slidable bar 99 supported in bearings 100. A link 101 is connected at one end with an extension 102 of the bar 99 and at its opposite end with the upper end of a lever 103. This lever is secured to a shaft 104 and this shaft in turn carries a forked lever 105, the lower ends of which engage a yoke 106 to impart endwise movement in one direction or the other to a clutch jaw 107. This clutch jaw is splined upon a shaft 108 and is provided with teeth 109 and 110 adapted to engage corresponding teeth 111 and 112 of bevel gear wheels 113 and 114. Motion is continuously imparted to both of these gear wheels through the medium of a bevel pinion 115 that is mounted upon a shaft 116, the latter being driven by a spur gear wheel 117 which meshes with the gear wheel 61 on shaft 60, this shaft 60 being in longitudinal alinement with and deriving movement from the engine shaft 69 as hereinafter set forth. The bevel gear wheels 113 and 114 are loose upon the shaft 108 and one or the other of these gear wheels may be clutched to said shaft to impart rotation thereto by bringing the clutch jaw 107 into engagement therewith. Since the gear wheels 113 and 114 rotate in opposite directions, it follows that rotation in one direction or the other will be imparted to the shaft 108 according to which of the gears 113 and 114 is brought into action by being clutched to the shaft 108 as aforesaid. The shaft 108 carries a gear wheel 108' which meshes with a large gear wheel 109', the latter constituting the driving member of a differential, illustrated conventionally at 112', see Fig. 4. The differential 112' drives pinions 121 that are mounted upon a hollow shaft 111', the latter forming a bearing for one end of the shaft 110'. The bearings 118 not only serve as a mounting for the shaft 111' but, in conjunction with corresponding bearings 118' carried by the horizontal angles 34, serve to pivotally mount yokes 120. These yokes are substantially, horizontally disposed and have swinging movement about the bearings 118 118' for a purpose hereinafter set forth. The pinions 121 mesh with large gear wheels 122, secured to and imparting movement to the traction wheels 123.

It will, therefore, be apparent that vertical movement of the bar 89 in one direction or the other will serve to impart movement to the traction wheels 123 in one direction or the other because the vertical movement of the bar 89 controls the clutch jaw 107 in Fig. 7 through which the direction of rotation of shaft 108 is controlled. The upper end of the bar 89 is pivoted at 124 to the end of a rocking lever 125, the latter being journaled at 126 upon a bracket 127, said bracket being carried by the horizontal angle 31. The opposite end of the lever 125 is engaged with the lower end of a stem 128 which is slidably mounted in the sleeve 41. The upper end of the stem 128 is provided with flanges 129 between which a ring 130 has a seating and this ring is engaged by one of the arms 131 of a bell crank lever that is pivoted at 132 in bearings 133 supported from the longitudinal frame members 28. The other arm of the bell crank lever is connected by a reach rod 135 with an operating handle 136. If the handle 136 be pulled rearwardly, it is apparent that the reach rod 135 will be drawn upon to lift the stem 128. This will result in pushing bar 89 downwardly and if the handle 136 be actuated in the opposite direction, the bar 89 will be drawn upwardly with a result which will hereinafter be described. A cable 137 passes over a pulley 138 and its ends are connected at 139 to the operating handle 136 and by means of this cable, the operating handle may be actuated from a remote point as, for instance, from a plow or other agricultural implement that is being drawn by the tractor. In like manner, I may if desired pass a cable 140 about a grooved steering wheel which may be substituted for the steering wheel 47 so that the steering of the tractor may be controlled from the implement being drawn. To permit the traction wheels 123 to have individual vertical movement to adapt them to accommodate inequalities in the ground that is being passed over, said traction wheels are journaled by means of stub-shafts 142 in bearing brackets 143 secured to the outer ends of the yokes 120. These bearing brackets are provided with semi-circular seats 144 in which the lower ends of wear plates 145 have a seating. These wear plates are bolted to the lower portions of the legs 146 of vertical yokes 147 and are pivoted at 145' to the yokes 120. The wear plates 145 have sliding engagement with the guide plates 39 hereinbefore described.

The upper portions of the vertical yokes 147 carry crossheads 148 which have slidable mounting between wear plates 149 and 150 supported by the vertical angles 33 and the vertical bars 29, respectively. Walking beams 151 are pivotally connected at 151' to a cross-bar 152 which extends between the vertical bars 29 and is supported thereby. The outer ends of the walking beams lie upon opposite sides of bearing blocks 153 and 154 that are secured by bolts 155 to the vertical yokes. The ends of the walking beams engage pins 156 which have, intermediate their ends, spherical bearing members 157 which engage in concave seats 158 constituting the walls of elongated bearing slots 159 formed complementally in the blocks 153 and 154.

Since the distance from the center of shafts 142 to the center of shaft 110' never changes, it will be seen that the traction wheels 123 may have individual vertical movement, that is vertical movement with relation to each other, without interfering with the driving connection between the motor and the traction wheels. It will also be seen that the horizontal yokes 120 may move both above and below a horizontal line while, at the same time, the vertical yokes 147 are caused to always remain in a vertical position.

The rear portion of the main frame is supported upon ground wheels 160, which are journaled at 161 in forks 162. These forks carry vertical bearing pins 163 that are journaled in bearings 164, formed in plates 165. These plates are supported between transverse angle irons 166 which angle irons are, in turn, secured to the frame 5. Crank arms 167 are carried by the pins 163 and the free ends of these crank arms are connected by a reach rod 168. One end of this reach rod is connected by a ball and socket joint 169 with a steering link 170 and the opposite end of this steering link is connected by a like ball and socket joint 171 with an arm 172 that forms a part of a worm segment 173. This segment is pivoted at 174 to adapt it for swinging movement and its teeth are engaged by a worm 175 that is fast upon the lower end of a sleeve 176. This sleeve carries a steering wheel 177, said wheel serving to impart rotation to the sleeve and, consequently, to the worm 175 to actuate the segment 173, and thereby draw upon the steering link 170 to turn the front ground wheels 160 in a manner that will be readily understood. Since the stem 128 passes through the sleeve 41 and is, consequently, located concentrically with relation to the circular frame, and since the control of the motor is accomplished through the movement of this stem, and since the sheave 42 is likewise concentric with the circular frame, it follows that the circular frame may have a bodily turning movement with relation to the frame 5 without in any way interfering with the control of the motor or with the actuation of the mechanism by which the steering or turning of the circular frame is accomplished under the power of said motor, while at the same time, the operator may be seated upon the frame 5 or may occupy a distant position upon a plow or other machine being drawn by the tractor.

When the operator shifts the handle 136 either from a position at the driver's seat 48 or from a distant point, bar 89 is moved either upwardly or downwardly as hereinbefore set forth and the bar 99 is moved either to the right or toward the left (see Fig. 7) by reason of the engagement of the roller 96' in the cam groove 97. By referring to Fig. 9, it will be seen that the bar 89 is provided with three deep indentations; 89$^a$, 89$^b$ and 89$^c$ and that between the indentations 89$^a$ and 89$^b$, there is a shallow indentation 89$^e$ and that between the indentations 89$^b$ and 89$^c$ there is a shallow indentation 89$^f$. When the roller 88 is in engagement with either of the recesses 89$^a$, 89$^b$ or 89$^c$, the cone clutch member 72 is permitted to move toward the right to thereby come into clutching engagement with the clutch face of the fly-wheel 70 so that in all of these positions the shaft 60 is driven, it being understood that the sleeve 80 is suitably splined to accomplish this purpose.

If the bar 89 be moved upwardly to bring the roller 88 into the shallow recess 89$^f$, the cone clutch member 72 will be shifted to the left to disengage it from the fly-wheel 70 and the parts are so proportioned and arranged that the release of this clutch will be effected upon the initial upward movement of bar 89, it being understood that upward movement of bar 89 imparts upward movement to roller 96' which moves out of the central or neutral portion 97$^a$ of the cam slot 97 in the cam block 98 and thereby shifts said cam block bodily toward the right. This also carries bar 99 toward the right and link 101 brings the teeth of clutch jaw 107 into engagement with teeth 111 of the gear wheel 113 thereby clutching said gear wheel to the shaft 108. This clutching of the gear wheel to the shaft 108 occurs after the clutch 72 has been thrown out of action. A further upward movement of bar 89 results in the roller 88 entering the recess 89$^c$ thereby permitting the cone clutch member 72 to again move toward the right to clutch fly-wheel 70 and thereby impart rotation to shaft 60 and consequently to shaft 116 and the gear wheels 113 and 114.

If upon the other hand, the movement imparted to bar 89 is a downward one, roller 88 will first enter the recess 89$^e$. This will result in throwing the cone clutch out of action and in moving the roller 96' downwardly whereby movement to the left (see Fig. 7) is imparted to the cam block 98 with the result that the clutch jaw 107 clutches gear wheel 114 to the shaft 108.

By virtue of the novel combination and correlation of parts herein shown and described, it is possible to turn the traction wheels 123 to a position substantially at right-angles to that shown in Fig. 1. This coupled with the fact that the rear wheels are likewise dirigible, renders it possible to turn the tractor in a circle the diameter of which only slightly exceeds the total length of the tractor and the attached plow. Furthermore, since the power of the motor is utilized to accomplish this turning movement of the tractor wheel, it follows that larger and heavier tractor wheels with, consequently, greatly increased traction, may be employed. Furthermore, since both the traction wheels and the rear wheels are dirigible and under control of the operator, the front wheels may be caused to travel in a position in which they are off-set laterally with relation to the rear wheels. This is a feature of advantage when drawing multiple bottom plows.

In view of the many basically new features employed in this construction, it is to be understood that the invention is not limited to the precise construction shown in the drawings and described in the specification but that the invention includes within its purview such changes as fairly come within the spirit of the appended claims.

Having described my invention what I claim is:

1. The combination with a main frame, of a second frame mounted to turn therein, a motor carried by the second frame, a pair of traction wheels mounted in the second frame, and means for mounting said traction wheels for vertical movement with relation to each other while maintaining driving connection between the traction wheels and the motor.

2. In a tractor, the combination with a main frame, of a second frame mounted to turn therein, a motor carried by the second frame, a driving shaft deriving power from said motor, a pair of traction wheels and yokes within which said traction wheels are journaled, said yokes being movable about said shaft and means for driving from said shaft to the traction wheels.

3. In a tractor, the combination with a main frame, of a second frame mounted to turn therein, a motor carried by the second frame, a driving shaft deriving power from said motor, a pair of traction wheels and yokes within which said traction wheels are journaled, said yokes being movable about said shaft and means for driving from said shaft to the traction wheels, vertically disposed yokes connected to the free ends of the first named yokes, means for guiding the vertically disposed yokes and means for connecting the vertically disposed yokes and the traction wheels to have vertical movement with relation to each other.

4. In a tractor, the combination with a driven shaft, of a pair of traction wheels, yokes mounted to swing about the driven shaft and in the free ends of which said traction wheels are mounted, gear wheels carried by the traction wheels, pinions carried by the driven shaft which mesh with said gear wheels, a pair of vertically disposed yokes, the lower ends of which have pivotal engagement with the free ends of the first named yokes and means for connecting said vertical yokes to permit them to have vertical movement with relation to each other by preventing them from moving independently of each other.

5. In a tractor, the combination with a driven shaft, of a pair of traction wheels, a pair of yokes mounted to swing about said driven shaft and in the free ends of which said tractor wheels are mounted, a pair of vertically disposed yokes having pivotal connection with the free ends of the first named yokes, a walking beam pivoted intermediate its ends and having pivotal connection at its ends with the upper portions of the vertical yokes.

6. In a tractor, the combination with a driven shaft, of a horizontal yoke movable therearound, a bearing bracket secured to the free end of the horizontal yoke and having a concave seat in its upper face and a vertical yoke, the lower portion of which has a seating in said concave seat and means for preventing separation of the horizontal and vertical yokes.

7. In a tractor, the combination with a main frame, of a circular frame mounted to turn therein, an arcuate rack carried by the circular frame, a pinion meshing with said arcuate rack and supported from the circular frame, a motor mounted in the circular frame, traction wheels mounted in the circular frame, a driving shaft for the traction wheels, a clutch for controlling the movement of the driving shaft, said clutch comprising a clutch jaw which when moved in one direction imparts movement to the driving shaft in one direction and when moved in the opposite direction imparts movement to said shaft in the other direction, a driving member for the pinion, a clutch controlling said driving member and means acting through a point concentric with the circular frame for controlling both of said clutches.

8. In a tractor, the combination with a main frame, of a circular frame mounted to turn therein, an arcuate rack carried by the circular frame, a pinion meshing with said arcuate rack and supported from the circular frame, a motor mounted in the circular frame, traction wheels mounted in the circular frame, a driving shaft for the traction wheels, a clutch for controlling the movement of the driving shaft, said clutch comprising a clutch jaw which when moved in one direction imparts movement to the driving shaft in one direction and when moved in the opposite direction imparts movement to said shaft in the other direction, a driving member for the pinion, a clutch controlling said driving member and means acting through a point concentric with the circular frame for controlling both of said clutches, said means comprising a rotative sleeve, concentric with the circular frame, a member vertically slidable through said sleeve, connection between the sleeve and one of the clutches for controlling said clutch through the rotative movement of said sleeve and connections between the vertically slidable member and the other of said clutches for controlling the last named clutch through the vertical movement of said slidable member.

In testimony whereof the foregoing specification is signed at Greenville, Ohio, this 21st day of October, 1916.

CLIFFORD DRILL.

Copies of this patent may be obtained for five cents each, by addressing the "Commissioner of Patents, Washington, D. C."